United States Patent Office 2,909,491
Patented Oct. 20, 1959

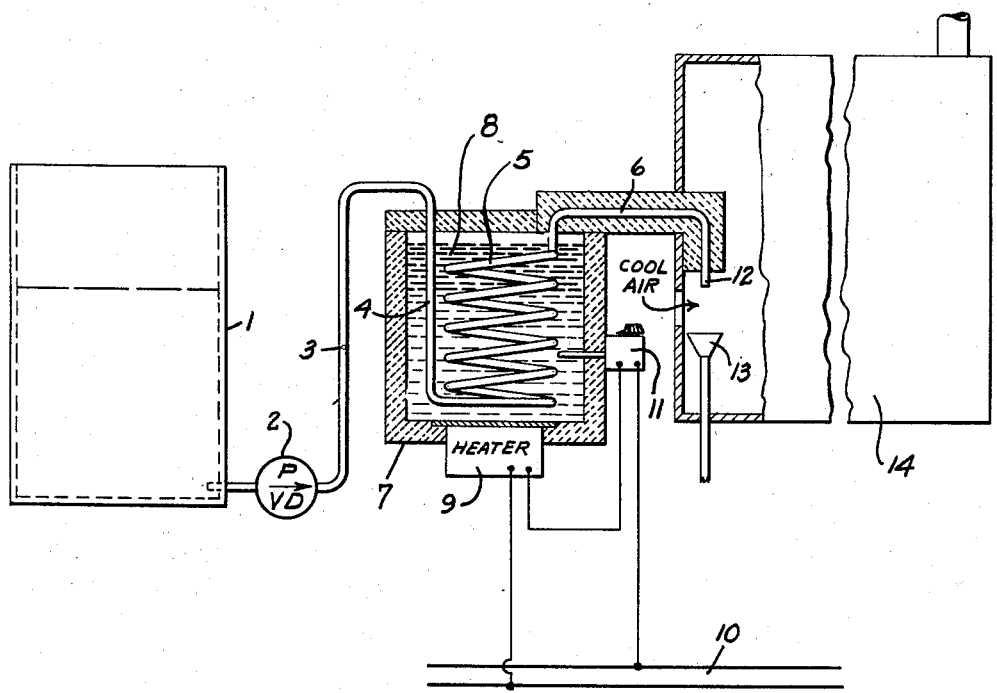

2,909,491

PROCESS OF FORMING A DISPERSION OF PARTICLES OF CONTROLLED SIZE

Carlyle Harmon and Hector Wallace Griswold, Longmeadow, and Joseph Harold Smith, Amherst, Mass., assignors to Chicopee Manufacturing Corporation, Chicopee Falls, Mass., a corporation of Massachusetts Application June 6, 1955, Serial No. 513,424

7 Claims. (Cl. 252—305)

The present invention relates to a novel and improved process for the efficient generation of particles of closely controlled size forming a dispersion in air of a treating material to be applied to fibers or other material.

The present invention has for its object the provision of a novel and improved process for the continuous generation of a dispersion in air or other gas of particles having closely controlled sizes, such that the mass median diameter of the particles is controlled to be between 0.3 and 10 microns, and most advantageously between 0.5 and 3.0 microns. A further object is the provision of a simple, economical process for the production of such a dispersion of treating material in air, produced from a solution or suspension of the treating material in a vaporizable liquid, which can be operated for long periods of time without substantial loss of the treating material by decomposition or otherwise. Still another object is the provision of a novel process which operates at relatively low pressures, requires no complex attachments to remove particles of unwanted larger sizes, and can be used with treating materials contained in water solution, or dissolved in other relatively inexpensive solvents. The invention provides a commercially feasible process for the production of relatively large volumes of such dispersions especially adapted to the treatment of large quantities of loosely matted fibers in which the treating material is deposited thereon with a high degree of uniformity, for instance in the treatment of picker laps of cotton fibers as a preliminary step in the making of spun yarn therefrom.

Heretofore, many processes have been proposed for the production of sprays, aerosols, smoke, fog and other dispersions of particles of widely varying sizes in air or other gas, but in general these processes have either been directed to the production of particles of colloidal size suspended in a gaseous medium, such colloidal particles having a mass median diameter less than 0.3 microns, or to the production of sprays or fogs of widely varying particle size. Collodial suspensions are subject to Brownian movement and are not adapted to be efficiently deposited on the material to be treated, which may be a porous mass of fibers. Other known processes have been such as to produce a coarse spray with many large particles, such that the mass median diameter of the particles is relatively large and usually much greater than 15 microns. When such large particles are produced, the suspension of particles in their gaseous medium is not well adapted to be used for the uniform application of the treating material forming the suspended particles to a mass of porous fibers at relatively low concentration because the presence of the large particles causes the fibers to be unevenly treated, one large drop or particle equalling a large number of the finer particles.

Where the treating material contained in solution has been sprayed to produce the suspension of particles, a large part of that spray is formed of particles having a diameter greater than 10 microns. When it is desired to use such a spray in the production of a dispersion having a mass median diameter of particles between 0.3 and 10 microns, and more especially when the dispersion is to be more closely controlled so that the mass median diameter of the particles lies between 0.5 and 3.0 microns, a very large portion of the spray is wasted in the subsequent baffling operation which must be used to remove the larger unwanted particles. Spraying through a nozzle also causes frequent failure due to clogging of the nozzle, and when the solution is heated, it is subject to rapid decomposition with resultant excessive loss of treating material. Also, the use of a spray requires relatively high pressures which further complicate the apparatus and process.

According to the process of the present invention, dispersions of closely controlled size can be efficiently produced in large quantity having particle sizes from 0.3 microns to 10 microns and even from 0.5 to 3.0 microns mass median diameter, and with from 95 to 99% of the number of particles having a diameter of 5.0 microns or less. These dispersions are thus distinguished from the size of particles normally produced by a spray which ranges from 15 to 20 microns, mass mean diameter.

In accordance with the process of the present invention, the treating material to be dispersed is a liquid, or a solid material which is non-volatile or less volatile than a volatile liquid to be more fully described hereinafter and which can be dispersed or vaporized without appreciable decomposition, and which readily congeals or condenses and is dissolved or dispersed, as a solution or emulsion, in a more volatile liquid, preferably a liquid which is easily evaporated. The solution of the treating material is composed of from 5 to 90% of the volatile liquid, preferably from 50 to 80% of the volatile liquid, and the best results are obtained when the volatile liquid comprises about two-thirds of the weight of the liquid and treatting material to be dispersed.

Water is the preferred volatile liquid, due to its relatively low boiling point, the greater cost of other materials and the problems of toxicity, flammability and recovery which are introduced by the use of other liquids, but other volatile liquids, such as ethyl alcohol, naphtha, acetone, carbon tetrachloride and the like may be used in case these various problems do not make their use impractical.

The solution or emulsion of the treating material is fed under a low pressure to a heating zone where it is subjected to intense heating for a very short period of time, the heating being sufficiently intense so that the solvent or continuous phase of treating solution or emulsion is rapidly vaporized along with the dispersion or vaporization of most or all of the non-volatile or less volatile treating material, after which the vapor and entrained particles are further heated for a very short period of time, and then the vapors are cooled so that the treating material may be rapidly condensed or congealed to form a dilute gaseous dispersion of the small particles of the dispersed treating material.

The heating is carried out under conditions of high heat transfer with the temperature of the heating medium being from 300° to 1000° F., the temperature being accurately controlled so that it is maintained substantially uniform throughout the process and throughout the various portions of the path of the stream of solution to be heated and dispersed or vaporized. The temperature is sufficiently high so that, considering the partial pressures of the components of the solution or emulsion, a substantial portion of the non-volatile or higher boiling constituent and substantially all of the lower boiling constituent of the liquid may be dispersed or volatilized.

The flow of the solution is continuous so that none of it is subjected to intense heating for a sufficiently long period of time to cause substantial decompositon of the treating material or its solvent. Preferably, the solution is fed to and through the heating zone under a pressure of from 1 or 2 to 15 pounds per square inch, pressures in excess of 15 p.s.i. tending to cause excessive surging of the liquid within the tubing in which the liquid is conducted and rapidly heated.

The tube in which the solution or liquid suspension of the treating material is conveyed and heated is resistant to the action of the solution contained therein, and is formed of good heat conducting material, such as metal, iron or steel being preferred because of the good chemical and physical properties of that metal, although copper, aluminum and other good heat conducting metals may be employed. The tubing is preferably of relatively small diameter such as ⅜ inch I.D., and is kept in excellent thermal contact with a heat transferring medium, which preferably comprises a liquid or partially molten bath, such as molten or melting lead or other metal, heated to a temperature of about 300° to 1000° F. (preferably 622° F. for lead). The temperature of the metal surrounding the tube is preferably well above the boiling point of the most volatile constituent of the treating solution, and preferably above the dispersion range or the boiling range or vaporization temperature of the major portion of the non-volatile or less volatile constituents of the solution or emulsion. The liquid is preferably heated to a temperature from 200° to about 800° F. above the boiling point of its low boiling constituent, to produce violent and disruptive boiling. The excellent heat transfer established between the bath of lead, or an alloy, such as a eutectic alloy, the highly conductive iron or other metal pipe and the liquid contained therein causing rapid heating of the liquid as it flows through the pipe so that the liquid is rapidly heated to boiling and is caused to form vapor containing finely dispersed particles. Thereafter, the heating is continued to cause further, substantial and rapid evaporation of the solvent material, as well as dispersion or vaporization of a major portion, and often all, of the dissolved or emulsified non-volatile or less volatile treating material.

The length of the pipe, in its heated portion is preferably from 400 to 3000 times its diameter, and in order to maintain the greatest uniformity of heating, the pipe enters the mass of heated metal, which is preferably of a molten metal such as lead (although it may be of solid or liquid metal, or salt) in a vertical, downward direction and then turns to form an upwardly directed helix, heat being applied to the metal heating bath at the bottom thereof, where the heat requirements created by the cold liquid are the greatest. The upwardly directed helix extends beyond the point where vaporization or boiling occurs, so that the vapors suspending the treating material are further heated to insure extensive dispersion or vaporization of both the solvent and solute or emulsified material. The pressure applied to the solution fed to the pipe and helically wound portion, and the heat transferred to the liquid within the coiled pipe are such that the point at which boiling occurs is substantially midway of the helically wound portion of the coil.

The pipe is preferably of substantially uniform diameter throughout its heated portion, and the pipe terminates in a portion which is substantially without restriction from the point of boiling to the point where the vapors are delivered from the pipe. Thus conveniently and preferably, the pipe is made from tubing which is of a uniform internal diameter from end to end.

The solutions fed to the pipe and to be heated and transformed into a dispersion of closely controlled particle size are usually in water solution or emulsion, and within the water are dissolved, emulsified or suspended 5 or more percent of a higher boiling or non-volatile or less volatile treating material such as polyoxyethylene sorbitan monolaurate (20 mols polyoxyethylene or 8 mols), sorbitan monolaurate, sorbitan monopalmitate, polyoxyethylene nonyl phenol (10 mols), dioctylphthalate, polyoxyethylene castor oil, polyoxyethylene lauryl ether (7 mols), stearic acid, vegetable oil, mineral oil, plant wax, coconut oil, polyoxyethylene, polyvinyl alcohol, dyes, resin-forming compositions, or non-aqueous solutions such as carbon tetrachloride solutions of diphenyldichlorosilane, or alcohol solutions of dyes or resins. Such solutions or suspensions are preferably used containing from 5 to 95% of the treating material, and the liquid and the solute or emulsion have widely spaced boiling points or relatively great differences in volatility at the boiling point of the solvent.

Care is taken to avoid any substantial cooling of the vapors after they are formed and until they reach the point where condensation is to take place. The vapors with some dispersed material as so produced are then ready to be expanded and diluted with a cool relatively dry gas, such as air at room temperature, which expansion and cooling causes sudden condensation of the higher boiling or non-volatile or less volatile treating material which has been dispersed or vaporized as fine particles of a controlled size. The cool diluent gas is sufficiently warm and dry so that with the vapor solvent liquid added to it, the dew point is not reached and the solvent remains vaporized. Any course particles are removed by means of a trap, but very few such coarse particles are formed by the process of the present invention.

Specifically, a preferred and illustrative operating method according to the process of the present invention comprises feeding a 10% by weight solution of "Tween 20" (polyoxyethylene sorbitan monolaurate in which each molecule of the compound contains about 20 mols of polyoxyethylene) under about 5 pounds per square inch pressure through a ¼" (nominal) steel tube which is immersed in a bath of molten lead heated to about 700° to 800° F., heat being applied to the bottom of the vessel in which the molten lead is contained, the tube entering the lead in a vertically downward direction and then turning to form an upwardly extending helix comprising a considerable number of turns, such as seven, the helix having an internal diameter of about 8 to 12 inches. At its upper end the helix emerges from the heated lead mass and turns to discharge the vapor and dispersion, this discharge preferably being into a precipitation chamber so that any drip or large particles tend to settle out from the vapor.

The rate of flow of the solution through the tubing, the heat input into the tubing and into the solution, the heat transfer through the tubing and the latent heat of evaporaion of the low boiling constituents of the solution are such that vigorous boiling of the liquid occurs about midway of the helix, and if seven helical coils are used the boiling will usually be complete between the third and fourth coils of the tubing.

As the liquid boils vigorously, fine particles of the dissolved or suspended material are formed, and these are further heated during their passage through the remainder of the heated coil so as to remove from the particles all of the remaining solvent contained therein and extensive dispersion or vaporization of the non-volatile or less volatile material is also achieved due to the partial pressure of the solvent at the elevated temperature. The vapors are then discharged from the tubing, expanded and are mixed with a larger volume of cool gas, such as air, to condense or congeal the particles, thereby forming a dispersion of particles which have a mass median diameter of less than 10 microns, and with many materials and with carefully controlled operating conditions, the mass median diameter of the particles may be maintained at less than 3.0 microns. Preferably, the conditions of operation are maintained so that the mass median particles size is always between 0.50 and 3.0 microns.

The amount of water contained in the solution or emulsion of the treating material and the rate of chilling of the superheated vapors as they are diluted by the cool gas form the principal factors in varying the mass median diameter of the particles in the resulting dispersion, and as the rate of chilling and the water content of the solution or emulsion is raised from 5% to 90%, the size of the particles in the resulting dispersion is decreased. Some control of the particle size may also be obtained by varying the pressure at which the solution or emulsion is fed to the heated tube and by increasing the temperature of the molten metal bath as the pressure is increased. However, with many treating materials, such an increase in temperature causes excessive decomposition of the treating material and premature coking in the upper portion of the helical heating coil.

The temperature of the molten metal bath is closely controlled, preferably within a narrow range of 10 to 30° F., and the portion of the tube in which the treating solution or emulsion is heated and its vapors discharge is preferably insulated so as to prevent appreciable condensation of either the solvent or the vaporized treating material.

In many instances, improved results may be obtained by operating at the temperature of a melting metal, such as lead or one of its alloys, and this gives the added advantage of close and almost precise temperature control due to the latent heat of fusion of the metal, thereby compensating for any temporary and momentary changes in the rate of flow of solution or in the amount of heat supplied to the apparatus. Where other specific temperatures are required, the same advantages may be obtained by using other metals or alloys or salts as the heating medium surrounding the solution containing tube, and by operating at the melting point of the metal, alloy or salt with a portion thereof in the molten condition.

The single figure of the drawing schematically illustrates a present preferred and illustrative form of apparatus for carrying out the process of the present invention.

The solution or emulsion of treating material contained within a tank 1 is delivered therefrom by means of a motor-driven variable discharge pump 2 to a pipe or tube 3 which leads to a downwardly-extending vertical pipe 4 connected to the bottom of a helically formed pipe 5 which terminates in an outlet portion 6 of the pipe, the pipe being of substantially the same internal diameter throughout its length and formed of any substantially non-corrosive material, such as iron. The downwardly extending and upwardly extending and usualy helical portions of the pipe 4 and 5 are contained within covered and insulated vessel 7 which is filled with good heat conducting material 8, such as metallic lead, a metal alloy or a compact salt suitable for forming a salt bath. At the bottom of the vessel is a source of heat such as an electric resistance heater 9, the upper surface of which is in good thermal contact with the metal or salt 8 filling the vessel 7. Power is supplied to the heater 9 from the mains 10 under control of an adjustable thermostat 11 which is controlled by the temperature of the metal or salt within the vessel 7. As previously described, the metal 8 is preferably metallic lead which is maintained at its melting point so that a portion of it is molten and other portions of it are solid, thereby reducing the frequency of operation of the thermostat and giving a more constant temperature control than is otherwise possible.

The helically wound pipe 5 is conveniently of about ¼ inch internal diameter and the length of the immersed portion of the coil is about 10 to 25 feet of pipe immersed or embedded within the metal 8. In order to prevent premature condensation of the dispersed treating solution or emulsion, the outlet portion 6 of the pipe is thermally insulated and at its discharge end 12 is downwardly turned towards a drip-funnel 13, being spaced therefrom, so that any condensate or abnormally large particles tend to be removed from the vapor and dispersion leaving the outlet 6 as they are mixed with the larger mass of cool air or other gas which serves as a diluent and the conveying medium to transport the diluted dispersion to the fibers to be treated.

It will be understood that the foregoing general description and the following detailed description as well are exemplary and explanatory of the invention but are not restrictive thereof.

As the vapors discharge from the end 12 of the tube the vapors are expanded and simultaneously they are mixed with a relatively large volume of cool gas, such as air at a temperature of from about 40° to 120° F. and always several hundred degrees less than the temperature of the vapors issuing from the discharge end 12. This sudden expansion and chilling of the vapors, and dilution in a relatively cold gas which is not saturated with water or other vapor, causes a sudden condensation of the particles of the liquid or solid treating material originally dissolved or suspended in the more volatile solvent or continuous phase. The sudden expansion and shock chilling also results in the particles being of controlled, minute size and by proper control of the conditions, as above set forth, the mass median diameter of the particles may be kept within the desired limits of from 0.3 to 10 microns, and most desirably within the limits of from 0.5 to 3.0 microns.

Where the liquid to be vaporized is sufficiently stable so that it may be heated substantially above the boiling point of all of its constituents, the material issuing from the discharge end 12 is substantially all vapor or vapor and dispersed treating materials, with only a minor portion of entrained particles of a mass mean diameter less than 10 microns, and only a very few larger particles or drops, the larger particles or drops dripping from the discharge end 12 into the drip funnel 13.

Oftentimes however, it is desired to form a gaseous dispersion of materials which cannot be heated sufficiently above the boiling range of the non-volatile or less volatile constituent in the liquid due to the ease with which the non-volatile or less volatile constituent may decompose. Even with such material however, large volumes of gaseous dispersion of the material having a mass mean diameter within the range of 0.3 to 10 microns, and preferably 0.5 to 3 microns, is readily obtained due to the violent and disruptive boiling which occurs within the upper portion of the helical pipe 5. The disruptive boiling and superheating cause substantially complete vaporization of the more volatile constituent of the liquid while the non-volatile or less volatile component of the liquid is dispersed or volatilized to a substantial extent, the remainder of the non-volatile or less volatile component being formed into a dispersion of controlled size, with only a minor portion of it forming large unwanted drops. The relative amount of the vapor and controlled size gaseous dispersion depend upon the constituents of the liquid, and the temperature to which the liquid and dispersion are heated.

For confining the vapors and the condensed dispersion formed therefrom and for increasing the rapidity of chilling of the vapors issuing from the discharge end 12 of the tube 6, the end 12 is preferably positioned within a precipitation chamber 14 closely adjacent to an air inlet through which cool and unsaturated air is drawn by means of a fan, not shown, so that the dispersion so formed may be delivered from the precipitation chamber to the fibers to be treated with the dispersion.

The insulation surrounding the discharge pipe 6 keeps the vapors, which have been superheated, from gradual cooling which might cause premature condensation with the resultant formation of particles which are too large.

The invention in its broader aspects is not limited to the specific mechanisms shown and described but departures may be made therefrom within the scope of the accompanying claims without departing from the principles of the invention and without sacrificing its chief advantages.

What is claimed is:

1. The process of forming a dispersion of particles of closely controlled size which comprises subjecting a composition comprising a material for treating fibers and a volatile liquid having a boiling point not in excess of the boiling point of water to a low pressure not substantially exceeding about 15 pounds per square inch and a relatively high, closely controlled temperature of from about 200° F. to about 1000° F. above the boiling point of water to volatilize at least a substantial portion of said volatile liquid, said material for treating fibers being non-volatile at the volatilization temperature of said volatile liquid, further heating the material for treating fibers at substantially the same relatively high, closely controlled temperature to disperse the same in the volatilized liquid, and maintaining said temperature and avoiding any abrupt change in pressure until the volatilized liquid and dispersed material therein are suddenly cooled and diluted by a gas at a temperature above the dew point of said gas with respect to said liquid to produce the dispersion of particles of closely controlled size.

2. The process of claim 1 in which the liquid is water which is present in an amount from about 5% to about 90% of the combined weight of the water and said material, and the mixed vapors are cooled to a temperature less than 120° F. by dilution with air.

3. The process of claim 1 in which the material is a polyoxyethylene derivative of sorbitan monolaurate which is present in an amount of from about 95% to 10% of the combined weight of the liquid and said material.

4. The process of claim 1 in which the material is a sorbitan monolaurate which is present in an amount of from about 95% to 10% of the combined weight of the liquid of said material.

5. The process of claim 1 in which the material is a sorbitan monopalmitate which is present in an amount of from about 95% to 10% of the combined weight of the liquid and said material.

6. The process of claim 1 in which the material is a polyoxyethylene derivative of a fatty acid ester of a hexitol which is present in an amount of from about 95% to 10% of the combined weight of the liquid and said material.

7. The process of claim 1 in which the material is a fatty acid ester of a hexitol which is present in an amount of from about 95% to 10% of the combined weight of the liquid and said material.

References Cited in the file of this patent

UNITED STATES PATENTS

| | | |
|---|---|---|
| 1,890,429 | Griswold | Dec. 6, 1932 |
| 2,402,899 | Knapp | June 25, 1946 |
| 2,416,256 | Hochberg | Feb. 18, 1947 |
| 2,437,963 | Langmuir et al. | Mar. 16, 1948 |
| 2,517,049 | Stevens | Aug. 1, 1950 |
| 2,637,662 | Russell | May 5, 1953 |